United States Patent [19]

Hall

[11] Patent Number: 5,549,281
[45] Date of Patent: Aug. 27, 1996

[54] LIQUID SPRING FOR PUNCH PRESS

[76] Inventor: G. Gordon Hall, Box 156, Millgrove, Ontario, Canada, L0R 1V0

[21] Appl. No.: 186,286

[22] Filed: Jan. 25, 1994

[51] Int. Cl.⁶ ..................................................... F16F 5/00
[52] U.S. Cl. ........................................ 267/119; 267/64.13
[58] Field of Search .......................... 92/109; 267/64.13, 267/64.26, 64.28, 130, 64.11, 119; 188/322.19; 83/639.1, 639.5, 137

[56] References Cited

U.S. PATENT DOCUMENTS

| 2,659,348 | 11/1953 | Taylor | 91/470 |
|---|---|---|---|
| 2,660,984 | 12/1953 | Zumwalt | 91/404 |
| 2,704,125 | 3/1955 | Taylor | 83/137 |
| 2,716,451 | 8/1955 | Taylor | 83/137 |
| 2,729,440 | 1/1956 | Wales | 267/64.11 |
| 2,732,898 | 1/1956 | Taylor | 83/137 |
| 2,757,735 | 8/1956 | Taylor | 83/137 |
| 3,180,634 | 4/1965 | Heiser | 267/119 |
| 3,193,875 | 7/1965 | Taylor | 91/31 |
| 3,933,344 | 1/1976 | Taylor . | |
| 3,947,005 | 3/1976 | Wallis | 267/119 |
| 4,233,872 | 11/1980 | Schulze | 83/617 |
| 4,529,181 | 7/1985 | Wallis . | |
| 4,611,794 | 9/1986 | Taylor . | |
| 5,129,635 | 7/1992 | Holley | 267/64.26 |
| 5,152,547 | 10/1992 | Davis | 280/707 |
| 5,314,172 | 5/1994 | Wallis | 267/119 |
| 5,318,281 | 6/1994 | Wallis | 267/64.28 |

FOREIGN PATENT DOCUMENTS

| 519546 | 12/1992 | European Pat. Off. . | |
|---|---|---|---|
| 1369065 | 6/1964 | France . | |
| 2590951 | 6/1987 | France . | |
| 46-12595 | 3/1971 | Japan | 83/137 |
| 2164415 | 3/1986 | United Kingdom . | |

OTHER PUBLICATIONS

Dadco Part List, Dadco, Inc., p. 7.
Teledyne Hyson Catalog, Teledyne Hyson, Brecksville, Ohio—5 pages.

Primary Examiner—Robert J. Oberleitner
Assistant Examiner—Chris Schwartz
Attorney, Agent, or Firm—Barry R. Lipsitz

[57] ABSTRACT

A metal working press employs a self-contained liquid spring adapted for the clamping of metal blanks during the performance of punching, cutting or forming operations thereon. The liquid spring comprises a fluid cylinder vessel filled with a pressurized compressible liquid in which is mounted a piston. The piston includes a piston head and a piston rod, which extends outside of the cylinder vessel through an annular seal at one end of the cylinder vessel. The piston head may have holes therein to permit the liquid to flow through the head during compression of the liquid in response to a force applied to the rod. The piston may include a liquid chamber communicating with the interior of the fluid cylinder vessel and extending through the piston head and along the shaft of the piston rod. The piston head may be closely fitted to and slidably guided along the interior surface of said cylinder or, alternatively, may be significantly smaller in diameter, in which case an elongated guide bushing is utilized to direct and guide movement of the piston.

24 Claims, 5 Drawing Sheets

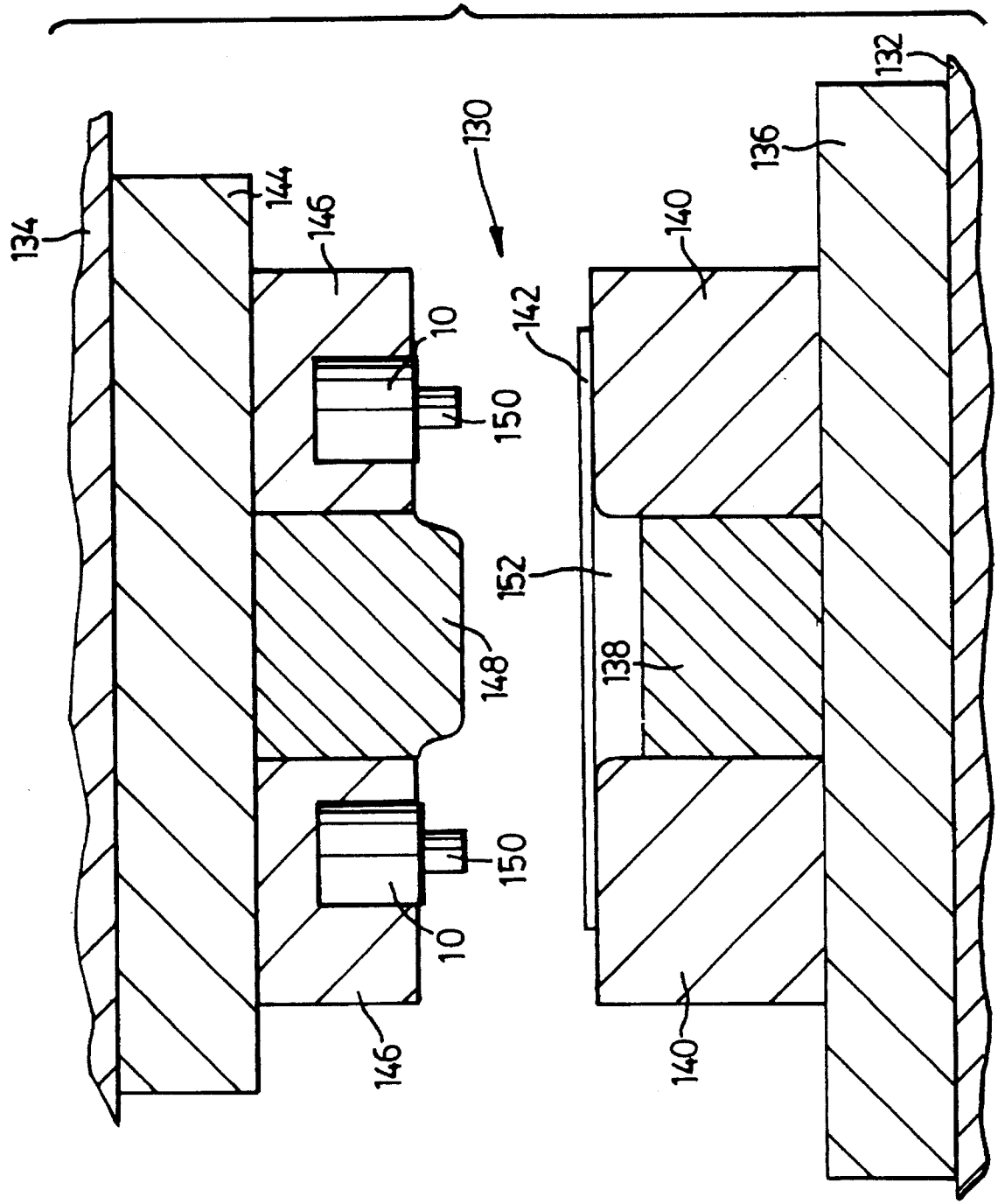

LIQUID SPRING FOR PUNCH PRESS

FIELD OF THE INVENTION

This invention relates to metal working presses and in particular to clamping devices for securing in place metal blanks or workpieces to be cut, punched, formed or stamped during the metalworking process.

BACKGROUND OF THE INVENTION

During the metalworking process metal is bent, formed, perforated, cut or stamped to produce a desired final or intermediary product. During each of the above processes, the blank, which is the material being worked, tends to move toward the site of the particular operation. This movement is caused by the bending and stretching of metal at the site of the operation as a result of the application of force to the blank. It is desirable in many situations that such movement be controlled and/or minimized, if not entirely eliminated, by holding the blank in a fixed position relative to the relevant die.

In order to releasably secure a blank in place, force must be exerted sufficient to overcome the lateral force applied by the impact of the die upon the blank. This is usually accomplished by the application of a clamping force roughly perpendicular to the plane of the lateral force. The clamping force must be sufficient to produce a lateral frictional resistive force sufficient to overcome the lateral component of the force being applied by the die.

Due in part to the need to quickly and smoothly apply such a force, it is common to utilize springs of one nature or another to attempt to hold the blank in place. Gas springs, rubber blocks and coil springs have been variously applied for this purpose but have been found wanting. Their chief disadvantages are the limitation on the maximum resistive force that can be generated by any such device and the necessity for frequent service. Typically, gas springs are initially pressurized to about 2500 p.s.i. The force produced by such a gas spring is only 2500 p.s.i. times the area of the piston rod chosen. Typically, space or room in a die is at a premium, as one skilled in the art would be aware, and any method to reduce the volume occupied by a clamping spring is a significant advantage. The known devices have the disadvantage of typically not being capable of producing enough force to fully and properly clamp the blank while at the same time taking up valuable room in the die. The use of the liquid spring described herein provides the advantage of generating a very high clamping force while occupying a space equal to or less than the known spring devices.

The use of springs of various kinds in the dampening of movement of dies and other metalworking equipment is also known. Gas springs have been used in a variety of die assemblies to apply yieldable resisting, biasing or cushioning forces to dies, as taught for example in U.S. Pat. No. 3,947,005, issued Mar. 30, 1976 to Wallis. The Wallis device incorporates a plurality of cushioning gas springs in a die assembly, which are utilized to apply a yieldable resisting force to a pressure pad used in a stamping press. The Wallis device also utilizes a gas spring in an ejector mechanism designed to remove the stamped work piece from the die member once complete. The Wallis springs are pressurized with an inert gas such as nitrogen, which can be supplied from a fluid accumulator via flexible conduits.

The use of a liquid filled device to eject punched material from a blank is described in U.S. Pat. No. 2,704,125, issued Mar. 15, 1955 to Taylor. The cylinder/plunger combination of this device is located centrally within the punching die in order to propel the workpiece out of the die assembly once cut free of the blank.

U.S. Pat. No. 3,180,634, issued Apr. 27, 1965 to Heiser, teaches the use of a liquid spring to simultaneously cushion die members and provide a biasing force to urge a pressure pad against the blank. The spring in the Heiser reference is a liquid spring incorporating a piston and cylinder arrangement wherein the piston is closely fitted to the inside diameter of the cylinder vessel. The volume of liquid in the cylinder is pressurized by an outside hydraulic system and therefore the spring is not a self-contained closed system as taught herein. Such an arrangement is undesirable because the repeated impact shock of the descending die will interfere with the integrity of hydraulic fittings in high pressure hydraulic systems and such a system requires that hydraulic hoses, fittings and other components be connected up to the press and therefore would be required to move constantly with the press movement. It is also difficult with such a hydraulic system to generate sufficient clamping and reactive force from the spring. Also, because of the complexity of the die, it can be very difficult to feed it from a hydraulic pressure source. The Heiser device does not rely on any compressibility of its liquid in its operation, using only a standard hydraulic fluid, and is thus unable to take advantage of the high levels of reactive force that may be achieved with compressible liquids.

Other liquid springs are known which utilize compressible liquids in different applications other than metalworking. The compressibility of liquids, and therefore the reactive force capable of being generated by springs employing compressible liquids, increases dramatically with increased initial pressurization. It has not hitherto been appreciated that it is possible to use, obtain or build a self-contained, pre-pressurized liquid spring which is capable of delivering substantially increased clamping forces over conventional gas springs in order to hold a blank in place.

For example, a gas spring is not generally pressurized over 2500 psi. A pressure of 2,500 p.s.i. is often the highest used in gas springs because this is the pressure typically available from gas supply bottles or containers. A liquid spring can be pre-pressurized, if needed, to a level of 20,000 psi or higher depending on the desired characteristics. Thus, an area of one square inch in the gas spring of this example will produce a reaction force of 2500 lbs. while a liquid spring can produce an initial reaction force of 20,000 lbs or eight times more force.

An object of the invention is to provide a metal working press with one or more liquid springs adapted for clamping a metalworking blank or workpiece in place during the metalworking process, these springs employing a compressible, pressurized liquid.

It is a further object of the invention to provide a metal working press with at least one improved liquid spring which is capable of producing significantly higher reactive force in response to a given compressive force than that previously available with gas springs of conventional design.

The terms "blank" and "workpiece" are used interchangeably herein to refer to the unfinished workpiece or item being processed in the metalworking press. As used herein, the term "workpiece" is a broad term that includes a blank which generally refers to flat pieces of metal that have not been bent or worked by a press previously.

SUMMARY OF THE INVENTION

According to one aspect of the invention, a metalworking press comprises a die set;

a blank or workpiece supporting surface;

a liquid spring attached to the press comprising a high pressure cylinder vessel having an internal chamber defined by a cylinder wall, a first sealed end, a second sealed end, and a central axis extending between the first sealed end and the second sealed end, the second sealed end including an annular gasket, a compressible pressurized liquid contained in the internal chamber, a piston having a piston head located inside the internal chamber and having a front surface, a rear surface and a circumferential wall which is spaced apart from the cylinder wall, and a piston rod attached to the piston head and extending through the annular gasket to which it is sealably and slidably fitted, the piston rod having an inner end adjacent to the piston head and an outer end, which is outside the cylinder vessel, a gap being formed between said circumferential wall and said cylinder wall, said gap permitting said liquid to flow around the side of the piston head, wherein said liquid spring is mounted in said press to hold a workpiece in a desired position during operation of said press on said workpiece.

According to another aspect of the invention, a metalworking press comprises a die set;

a blank or workpiece supporting surface;

a liquid spring attached to the press comprising a high pressure cylinder vessel having an internal chamber defined by a cylinder wall, a first sealed end, a second sealed end, and a central axis extending between the first sealed end and the second sealed end, the second sealed end comprising an annular gasket, a compressible pressurized liquid contained in the internal chamber, a piston having a piston head located inside the internal chamber and having front and rear surfaces, piston aperture means passing through the piston head and communicating with the front surface and the rear surface, said aperture means at least allowing free flow of liquid from said front surface to said rear surface when said piston is forced into said cylinder vessel, and a piston rod attached to the piston head and extending through the annular gasket to which it is sealably and slidably fitted; and wherein the piston rod has an inner end adjacent to the piston head and an outer end, which is outside the cylinder vessel, wherein said liquid spring is mounted in said press to hold a workpiece in a desired position during operation of said press on said workpiece.

According to a further aspect of the invention, there is provided a method of holding in place a workpiece to be worked during a metalworking process into a desired object comprising the steps of providing a metalworking press having a die assembly and a blank or workpiece support surface mounted therein;

mounting a pressurized liquid spring in the press so that the spring is positioned to hold the workpiece in a desired position during operation of said press on said workpiece, said spring containing a compressible liquid;

positioning said workpiece to be worked on the support surface so that the workpiece is between the support surface and a movable end of said spring or some intermediate component;

urging the spring toward the workpiece so as to pin the workpiece between the movable end and the support surface with sufficient force to resist the workpiece from moving to an extent greater than desired tolerances;

urging the die set against the workpiece so as to form the workpiece into the desired object.

BRIEF DESCRIPTION OF THE DRAWINGS

Preferred embodiments of the invention both as to its operation and construction, together with the advantages thereof, may best be understood by reference to the following detailed description taken in conjunction with the accompanying drawings, wherein:

FIG. 7 is a fragmentary cross-sectional view of another die arrangement in a punch press employing liquid springs.

DETAILED DESCRIPTION OF THE PREFERRED EMBODIMENTS

Figure 1:
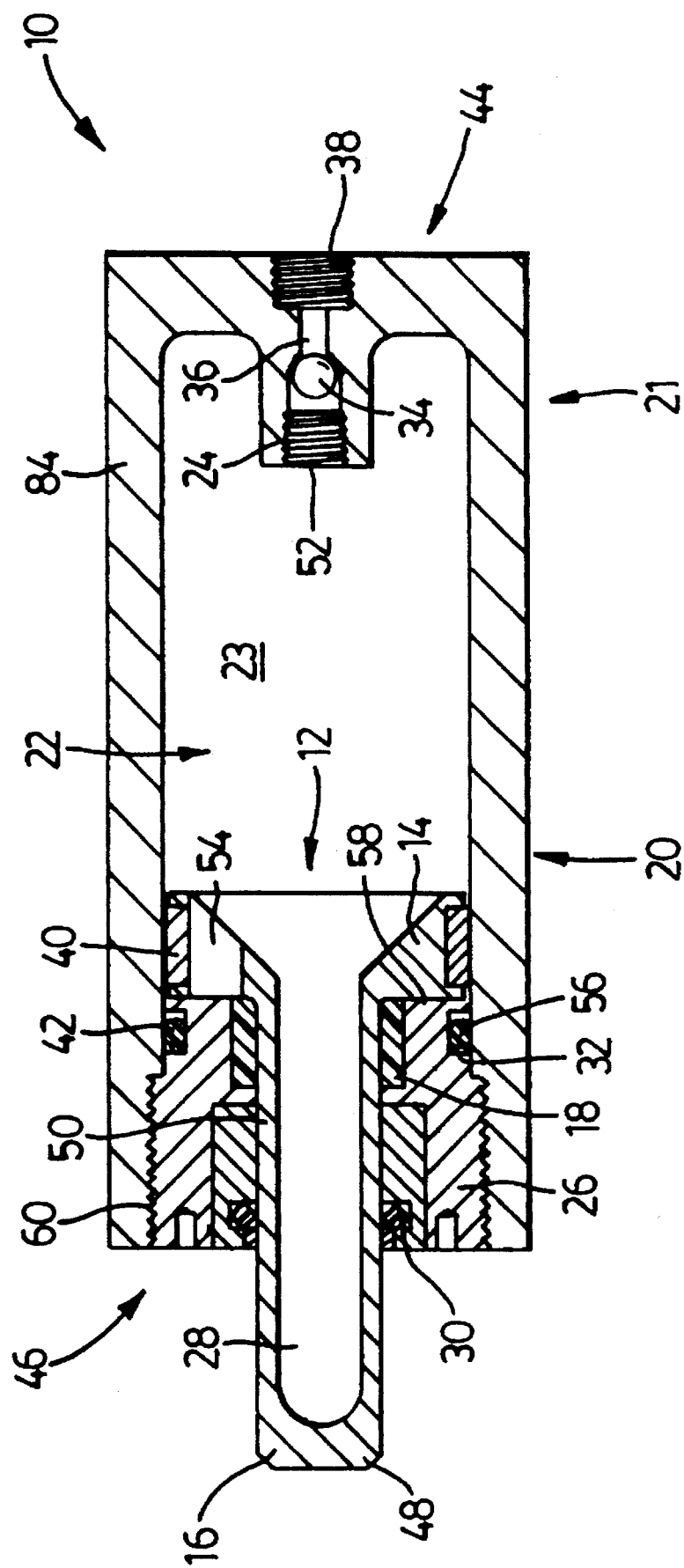
FIG. 1 is a longitudinal, cross-sectional view of a liquid spring according to the present invention.

In the description which follows like parts are marked throughout the specification and drawings with the same reference numerals, respectively. The drawing figures are not necessarily drawn to scale and the proportions of certain parts have been adjusted for purposes of clarity.

Referring to FIG. 1, a liquid spring suitable for use in the present invention is generally indicated by reference numeral 10. Liquid spring 10 includes cylinder vessel 20 in which is mounted a piston, generally indicated by reference numeral 12. Piston 12 includes piston head 14 and piston rod 16 attached thereto. In this preferred embodiment, the piston rod 16 is preferably concentrically aligned with cylinder vessel 20 and piston head 14. Cylinder vessel 20 has a vessel wall, generally indicated by reference numeral 21, which includes a first sealed end 44, a second sealed end 46 and a cylinder wall 84. Cylinder vessel 20 must be capable of safely withstanding internal pressures in excess of the maximum internal pressure that will be generated in the spring during its use. For most applications relating to the holding in place of a blank or workpiece in a metalworking press, it is desirable to construct the cylinder vessel 20 with a suitable safety factor chosen by the spring builder. For some applications of the invention, the maximum generated pressure in the spring can exceed 50,000 p.s.i.

As further described below, piston rod 16 has an inner end 50, which is located immediately adjacent to piston head 14, and an outer end 48 located outside the cylinder vessel 20. Piston rod 16 extends from piston head 14, which is held inside cylinder vessel 20 by end plug 26 having an annular seal assembly 18. The end plug 26 is in fact a gland housing. The piston rod must be made according to very close tolerances with no nicks and scrapes in its cylindrical surface to prevent leakage between the seal and the rod. The rod should have a highly polished surface.

Internal chamber 23 of cylinder vessel 20 is filled with a pressurized compressible liquid 22 which is preferably a low viscosity silicone based liquid such as a polydimethylsiloxane liquid. In this specification the term compressible liquid is intended to include suitable compressible materials, other than a gas, and includes various liquids and elastomers. Compressible liquids having viscosities between 200 cst and 12,500 cst have been found to be acceptable along with other materials. The viscosity of the liquid to be chosen can vary depending on several different factors and on the application. A higher viscosity liquid is easier to seal and could be better for some purposes of the invention. A very low viscosity liquid will tend to leak more easily. A polydimethylsiloxane liquid having a low viscosity of 200 cst and manufactured by Dow Corning as No. 200 silicone base fluid has been found to be suited to some applications of the present invention.

Compressible liquid 22 is inserted into internal chamber 23 of cylinder vessel 20 of an assembled spring 10 through valve assembly 24 mounted in first sealed end 44. It will be appreciated that a number of valve types may be utilized for this purpose. Moreover, valve assembly 24 may be mounted elsewhere in cylinder vessel 20 provided that the selected placement does not interfere with the level of structural integrity of cylinder vessel 20 required for safe operation and does not interfere with the movement of piston 12. The particular valve assembly preferentially employed in the embodiment of the invention depicted in FIG. 1 includes a first hydraulic pressure fitting 52, a second hydraulic fitting 38 (plug) and a ball valve assembly mounted therebetween including a valve ball 34 and a valve tube 36 suitable in size and shape for the ball 34. The fitting or plug 38 is inserted into the threaded opening after the spring has been charged to protect the threads in the opening and to provide a back-up to the ball valve. Under some circumstances no valve assembly 24 and fitting 38 are necessary as the cylinder can be filled prior to assembly of the spring with fluid, then cooled to shrink the fluid. The spring is then assembled and as the assembly warms up the expanded fluid pressurizes the cylinder to a predetermined amount.

The cylinder vessel 20 is filled with compressible liquid 22 until the desired minimum operating pressure level required for the particular application is reached. Although the initial pressure level employed depends upon the specific application for which a given spring 10 is intended to be used, an initial pressure in the range of 2,000 p.s.i. to 20,000 p.s.i. is preferred. The advantages of such pressure levels are discussed further below. It will be clear to someone skilled in the art that the pressure desired to be employed will dictate certain design features of a specific spring for a press made according to the invention in order to ensure that such spring may be safely manufactured, charged and operated. Each liquid spring for purposes of the invention is designed to withstand the maximum liquid pressure that will be generated during the stamping operation. The spring designer seeks to minimize the stress on the selected materials used to make the spring. The initial reaction force of the spring is equal to the transverse cross-sectional area of the piston rod times the initial pressure of the fluid. When a force is applied to the piston in excess of the preset force, the piston wil move into the cylinder and compress the liquid. The reaction force from the spring will increase in proportion to the compressibility of the liquid and the force applied to the spring. The important design criteria for any particular spring used in the invention is the maximum pressurization level the spring can attain to achieve the required clamping force. In most liquid springs the maximum operating pressure would be less than 75,000 p.s.i. for purposes of the present invention. The maximum initial pressurization level for a spring used in the invention is for practical purposes about 20,000 p.s.i. This is based on the equipment, namely the pump and the fittings needed, that is used to deliver the pressurized liquid to the spring. If the pressure needed was above 20,000, the required equipment to pressurize the spring would be very expensive. However, there are ways that one could achieve an initial pressure over 20,000.00 if this were desired, for example, by using a special intensifier.

In order to seal the cylinder vessel 20 at the second sealed end 46, end plug or gland housing 26 is sealably threaded into cylinder vessel 20. The specifications of the cooperating male and female threads portions 60 are designed in accordance with generally known engineering principles and do not form part of this invention. These threads are known construction. End plug 26 is annular in structure and includes annular seal assembly 18, annular wiper 30 and O-ring groove 56.

In a preferred embodiment, the seal assembly 18 is a nylon seal or a filled Teflon seal of known construction and is precisely fitted to seal around piston rod 16 with zero leakage while permitting rod 16 to slide freely therethrough without wear. A seal assembly distributed in Canada by Shamban Canada Inc. under the product name VARISEAL has been found to be particularly appropriate. Filled Teflon seals produced by Double Seal Co. of Fort Worth, Tex., U.S.A. or Kaydon of Baltimore, Md., U.S.A. have also been found to be satisfactory. In these seals, carbon and copper alloys are used as a filling agent. It will be appreciated that a variety of seal assemblies may be satisfactorily employed depending upon the intended application for which a given spring is designed.

Annular wiper 30 extends around the rod 16 and is of known design. It will be apparent to someone skilled in the art that various different wipers may be employed to protect rod 16 and seal 18. The structure of the wiper per se does not form part of the present invention and will therefore not be discussed in greater detail.

O-ring groove 56 is spaced back from front face 58 of end plug 26 but is also spaced forward of threaded portion 60. O-ring 42 is fitted into groove 56 along with backup ring 32. The o-ring 42 is of suitable size and consistency to seal between the gland housing 26 and the cylinder vessel 20 to which gland housing 26 is closely fitted. The o-ring 42 is a static seal and a variety of seals will work for this purpose.

Figure 3:
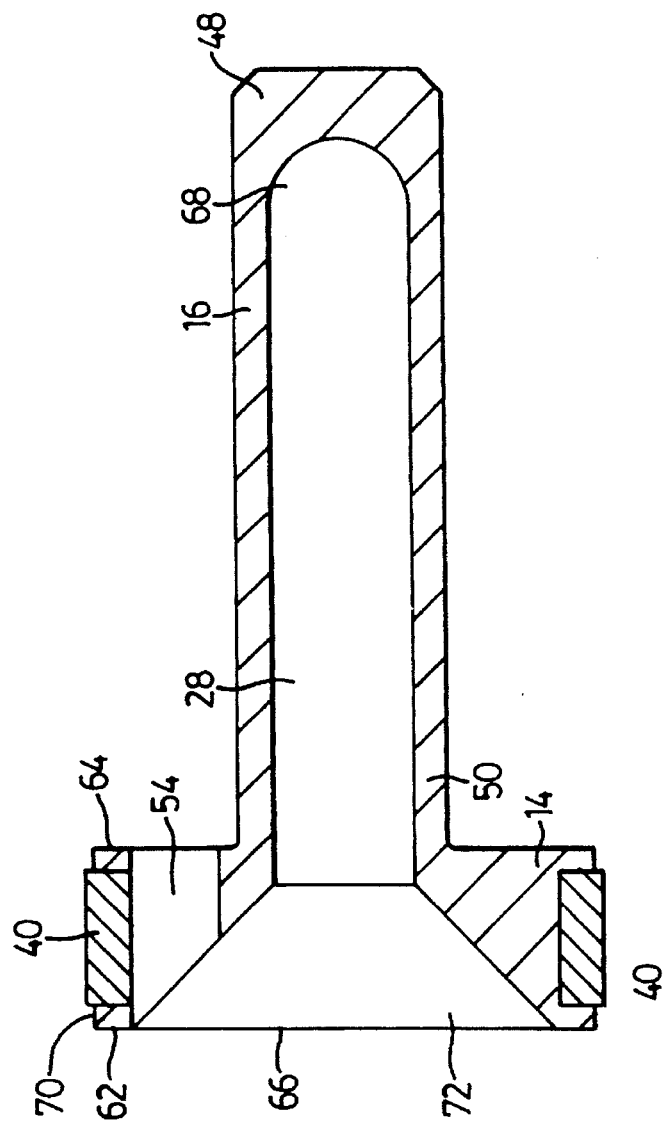
FIG. 3 is a longitudinal cross-section of the piston of FIG. 2.
Figure 2:
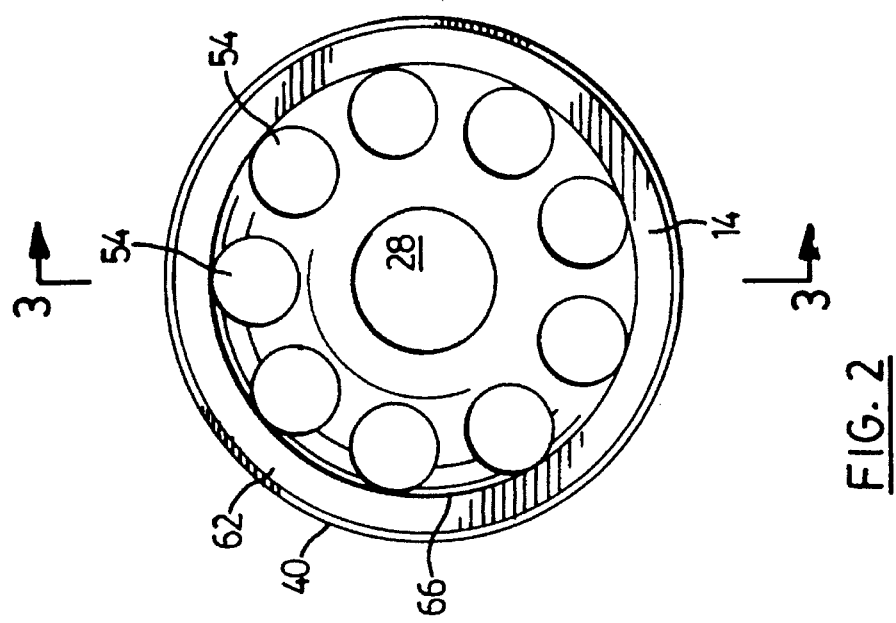
FIG. 2 is an end view of one embodiment of a piston for a liquid spring according to the present invention.

Referring to FIG. 2 and FIG. 3 as well as FIG. 1 previously discussed, the piston head 14 is desirably cylindrical in shape having a front surface 62, a rear surface 64 and a circumferential wall 70. A liquid chamber 28 may be incorporated into piston 12, if desired. The liquid chamber 28 includes an open end 66 and a closed end 68. Open end 66 is at front surface 62 but may be positioned on piston head 14 in a variety of arrangements other than that depicted provided that accommodation is made for the connection of piston rod 16 and the inclusion of guide ring 40, which is recessed into circumferential wall 70. Liquid chamber 28 may extend only part way into piston head 14 (not shown) or may extend substantially all the way along the length of rod 16 so that closed end 68 is adjacent to and defined by outer end 48 of piston rod 16. The incorporation of liquid chamber 28 into piston 12 enables the spring 10 to have a greater volume of compressible liquid 22 for a given size of cylinder vessel 20 and this gives the designer of the spring greater flexibility in the force curve that can be used with the spring. Liquid chamber 28 may be cylindrical in shape along its entire length (not shown) or may have a flared mouth 72, as depicted in FIG. 1 and FIG. 3. The reason for the flared mouth 72 is to increase the volume of liquid in the spring, thereby again providing the spring designer with more flexibility in the available force curve. It will be appreciated by someone skilled in the art that the dimensions of chamber 28 will be determined in part by the minimum wall thickness required to maintain the structural integrity and useful strength of piston rod 16.

Piston head 14 has one or more apertures 54 extending from front surface 62 through rear surface 64. For the purposes of this specification, front surface 62 includes any angled surface defining flared mouth 72 where such is included. An equal number of apertures 54 may be provided, if desired, and they may be arranged in diametrically opposed pairs about piston head 14. The purpose of these apertures is to permit the free flow of liquid from one side of the head to the other during operation of the spring.

During assembly, spring 10 is pre-charged with compressible liquid 22 in order to completely fill internal chamber 23 and place the liquid under an initial operating pressure. Where piston 12 includes liquid chamber 28 communicating with internal chamber 23, both must be filled completely with the desired liquid 22. Compressible liquid 22 may be supplied from supply means which may be another pressure vessel (not shown) or may be pumped using a high pressure hydraulic pump (not shown). The structure of the pump or outside pressure vessel does not form part of this invention and will not be detailed herein. The supply means is normally connected to cylinder vessel 20 by hydraulic hoses (not shown) with appropriate pressure fittings (not shown) each of which are of known construction. In the spring of FIG. 1, the hose end fitting is connected to the threaded aperture at 38 when the plug is removed. As a result of the pressurization of the cylinder vessel 20, piston head 14 is pressed back against end plug 26 thereby extending rod 16 to the fullest extent permitted. Once the cylinder vessel 20 is charged to the desired initial pressure, the hoses are detached from the cylinder vessel 20 whereupon valve assembly 24 is forced closed by the internal pressure of the cylinder vessel 20. The removal of the hoses offers a distinct advantage over liquid springs that remain connected to an outside pressure source since pipes, hoses and fittings required to connect such springs to their outside pressure sources are vulnerable to the continual vibrations and impact shocks of modern high speed presses resulting in increased down time and required maintenance. Also, commercialy available pipes, hoses, components and fittings typically are not able to withstand the high operating pressures (over 10,000 p.s.i.) that are generated with the liquid springs. Thus the liquid springs in the press of the invention are completely sealed off from external hydraulic parts and components and an external liquid supply.

The higher the pressure level chosen the more compressed the liquid becomes and the higher reaction force is generated per unit of piston stroke length. As a result, where the liquid spring 10 is initially pressurized during filling to high pressures, i.e. those in excess of 10,000 p.s.i., it is capable of producing very high reaction forces in response to relatively small movements of the piston in response to forces applied to the blank during the forming or punching process.

In order to hold in place a blank or workpiece to be worked upon, a clamping force is applied in order to urge the spring 10 against the blank, as depicted in FIG. 7, to prevent or resist blank movement. The clamping force applied to the spring 10 causes the piston head 14 to exert a compressing force against the liquid 22. As the liquid is further compressed, a substantial reaction force is exerted against the piston head 14 by the liquid 22. As a result, the blank is held in place against the die, upon which the blank is positioned by the reaction force generated by the spring 10. As the volume decreases in the spring in response to the piston moving into the cylinder during the forming process, the reactive force produced by the spring 10 increases as the fluid becomes compressed to hold the blank more and more tightly. When the clamping force is withdrawn, the pressure accumulated in the spring 10 is released thereby returning the piston 12 to its original extended position. The spring 10 is removed from the now formed piece releasing it for ejection or removal and replacement with a new blank in accordance with known methods. It will be appreciated that the spring 10 may be oriented relative to the blank being held so that either the piston rod 16 or the first sealed end 44 of cylinder vessel 20 is urged against the blank or against some intermediate piece or pieces.

Figure 4:
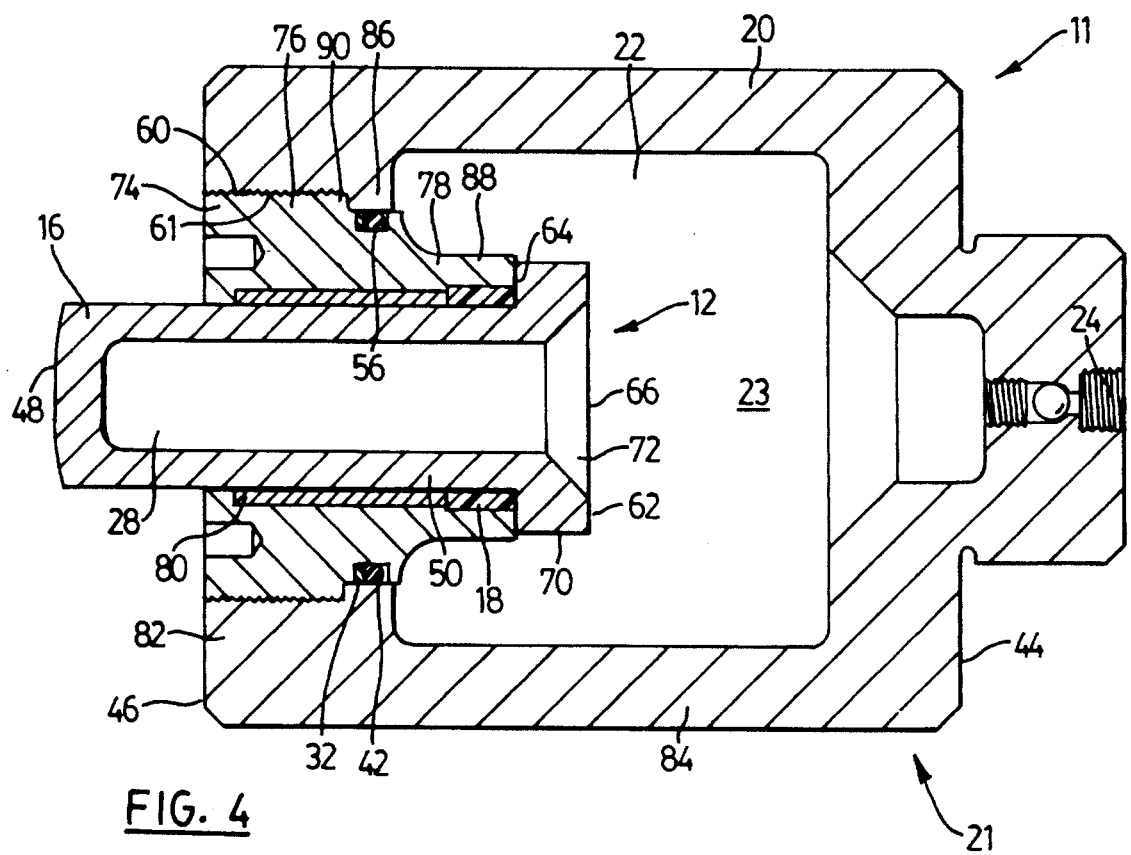
FIG. 4 is a longitudinal, cross-sectional view of a second embodiment of a liquid spring according to the present invention.
Figure 5:
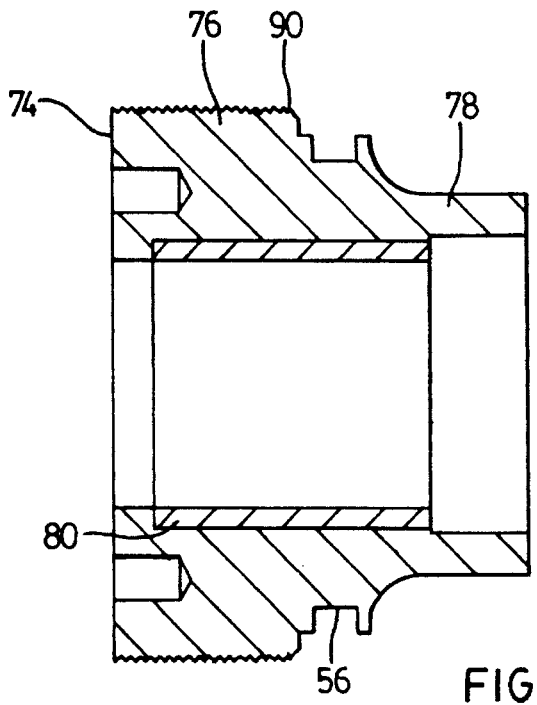
FIG. 5 is an axial, cross-sectional view of a gland housing for the second embodiment of the liquid spring.

Referring to FIG. 4 and FIG. 5, an alternative embodiment of a liquid spring according to the present invention is generally indicated by reference numeral 11. Liquid spring 11 comprises cylinder vessel 20 and piston 12 mounted therein. Cylinder vessel 20 has cylinder wall 84, first sealed end 44 and second sealed end 46. First sealed end 44 includes valve assembly which is substantially identical to that described above.

In this embodiment, the head of the piston 12 has a circumferential wall 70 that is spaced apart from the cylinder wall. Thus a gap is formed between these two walls which permits the liquid to flow around the side of the piston head.

Second sealed end 46 comprises annular, threaded collar 82 and annular, threaded end plug 74. Threaded collar 82 is continuous with cylinder wall 84 and includes female threaded portion 60 and inner flange 86, which is positioned between threaded portion 60 and the internal chamber 23 of the cylinder vessel 20.

End plug or gland housing 74 includes a male threaded portion (not shown) complimentary in size and shape to threaded portion 60, o-ring groove 56, plug shoulder 90 and annular piston collar 88, which projects inwardly from end plug 74 into internal chamber 23. Plug shoulder 90 abuts against inner collar 86 of cylinder vessel 20 to position end plug 74 ideally relative to threaded collar 82. Piston collar 88 includes annular seal assembly 18, which is a non-leak seal substantially identical to that discussed above, and a reasonably long annular guide bushing 80 which is closely fitted to piston rod 16 and provides the required guidance for the piston movement. Guide bushing 80 is a press-in bronze fitting of known construction. It will be apparent, however, to someone skilled in the art that a number of variant bushings may be employed with similar effectiveness.

For sealing purposes, o-ring 42 and backup ring 32 are mounted in o-ring groove 56. Each of said rings, 32 and 42, is sealably compressed against inner collar 86 of cylinder wall 84 to seal threaded end plug 74 to threaded collar 82 of cylinder vessel 20.

In use, the preferred embodiment depicted in FIGS. 4 and 5 operates in a substantially similar manner to that described above in respect of the first preferred embodiment but has a number of additional advantages over the first preferred embodiment and the prior art. In particular, there is no chance that vibratory or other deflections of the piston head will produce a scrubbing effect on and resulting damage to cylinder wall 84. Since the piston head need not be fitted to cylinder wall 84, internal chamber 23 may be of any shape desired provided cylinder vessel 20 is properly designed to be safely capable of withstanding the internal pressures that will be developed during the intended application.

The second preferred embodiment may be constructed using a variety of different constructions of pressure vessel other than conventional, symmetrical piston cylinder shapes. All such variant pressure vessel shapes that are strong enough to be practically useful in a particular application of this invention are intended to be included in the meaning of the words 'cylinder' or 'cylinder vessel' as applicable, as used in this specification. Since variant cylinder vessel shapes may be utilized, custom cylinders may be designed to most fully utilize whatever space may be available in a given press for installation of a spring capable of generating the greatest amount of reactive force while fitting in said space.

Figure 6:
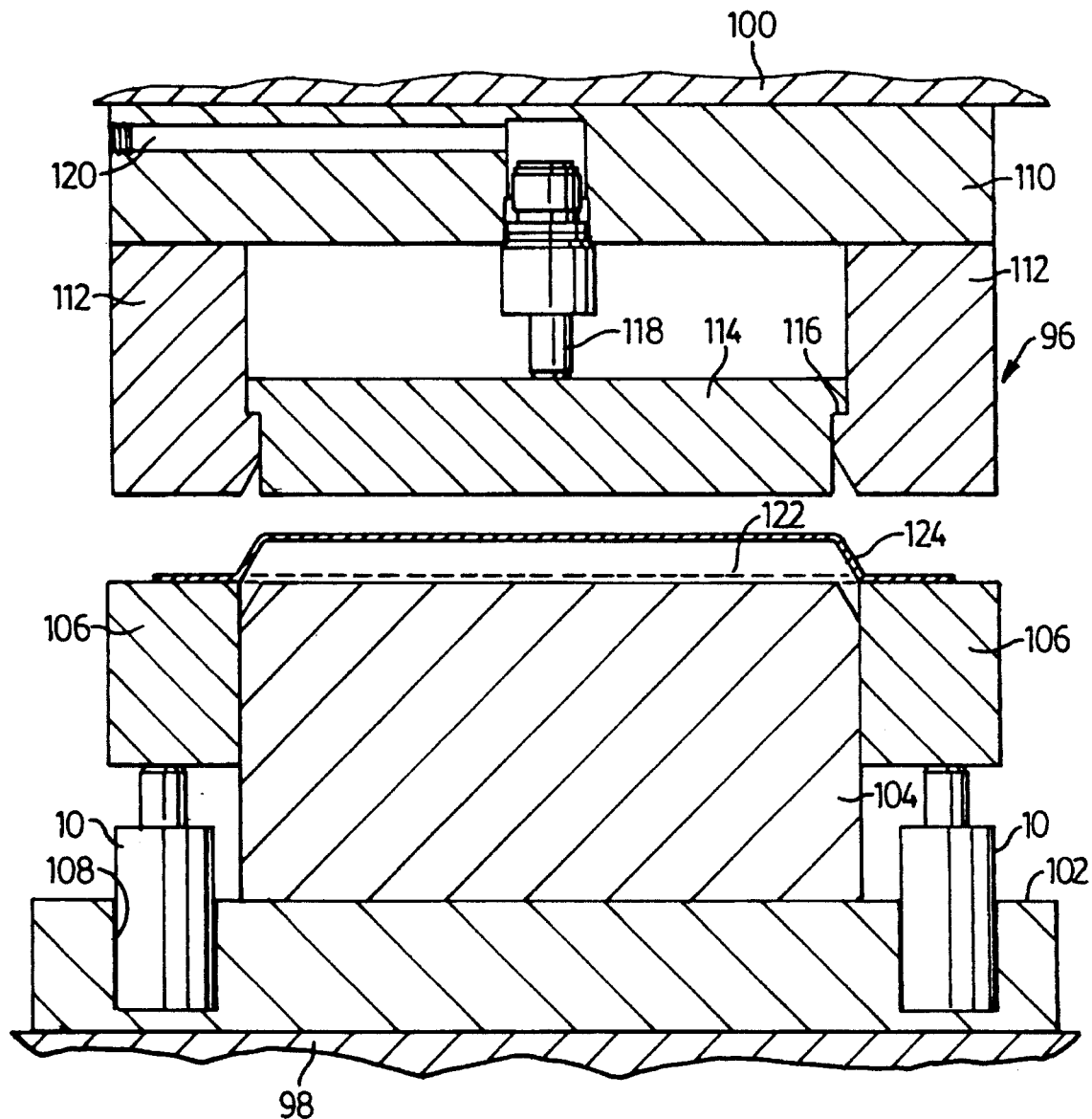
FIG. 6 is a fragmentary cross-sectional view of a die arrangement in a press employing the present invention.

Referring to FIG. 6, there is illustrated a simple die assembly 96 which is mounted within a conventional stamping press or metalworking press, only part of which is shown. The metalworking press includes a support plate 98 on which a lower die set is mounted and another support plate 100 on which an upper die set is mounted. Vertically extending guide pins (not illustrated) mounted in one of these support plates extends through openings in the other support plate so that the moveable plate is constrained to move toward and away from the fixed plate in a rectilinear path perpendicular to the die supporting faces of the two plates. The lower die set includes an adapter plate 102 mounted on the lower plate 98. A die 104 is fixedly mounted on adapter plate 102. In the arrangement illustrated, a pressure pad 106 is supported on the adapter plate 102 by a plurality of liquid springs 10. Each liquid spring is rigidly mounted in the adapter plate 102, such as by means of a cylindrical opening 108 sized to closely fit the exterior of the cylinder of the spring.

The upper die set includes an adapter plate 110 rigidly mounted on the upper support plate 100. A pair of die members 112 are fixedly mounted on adapter plate 110 to register vertically with the pressure pads 106 on the lower die set. Between the members 112 there can be a stripper die 114 which is supported for vertical movement on the members 112. Shoulders 116 interconnect members 114 and 112 to prevent the stripper die from moving downwardly relative to the members 112 beyond the position shown in FIG. 6. The die member is biased downwardly by one or more fluid spring assemblies 118 which may be constructed in accordance with the prior art. The adapter plate 110 is in the form of fluid manifold having one or more passageways 120 therein communicating with the inner ends of the prior art fluid spring assembies 118 and connected to a pressurized fluid accumulator.

In operation of the press of FIG. 6, a sheet metal blank 122 is supported on the upper faces of the pads 106. The top support plate 100 of the die set is driven downwardly so that the blank is clamped around its edges between the pads 106 and the members 112. As the upper plate 100 continues to descend, downward movement of pads 106 is yieldably resisted by the fluid springs 10. The upward movement of the die member 114 is also yieldably resisted to a predetermined extent by the prior art fluid spring 118 mounted in the upper adapter plate 110. In this manner, the blank 102 is securely held and formed by being stretched over the die 104 to form the stamping 124 which is ejected by the stripper 114.

Turning now to the embodiment illustrated in FIG. 7, in this metalworking press the liquid springs 10 of the invention are arranged to engage the workpiece or blank directly from above. In this embodiment the die assembly 130 includes a support plate 132 on which the lower die set is mounted and a support plate 134 on which the upper die set is mounted. Again, vertically extending guide pins (not illustrated) on the plate 132 can extend through openings in the plate 134 so that the plate 134 is constrained to move toward and away from the plate 132 in rectilinear path. The lower die set includes an adapter plate 136 mounted on the lower plate 132. Die members 138 and 140 are fixedly mounted on the adapter plate. In operation of this stamping press, a blank or workpiece 142 is placed on the die members 140 and is supported by these members from below.

The upper die set includes an adapter plate 144 rigidly mounted on the upper support plate 134. A pair of die members or support blocks 146 are fixedly mounted on the adapter plate 144. A plurality of liquid springs 10 constructed in accordance with the invention are rigidly mounted in these support blocks 146. A variety of connecting mechanisms can be used for this purpose including bolts or studs extending through connecting flanges or lugs (not shown) provided the connectors are able to withstand the forces generated by the stamping process. Located between the blocks 146 is an upper die member 148 which projects below the blocks 146 as shown.

In operation of the metalworking press of FIG. 7, the flat metal blank 142 supported by the die members 140 is first engaged by the projecting piston rods 150 as the top plate 134 is driven downwardly. In this way, the blank is clamped between the bottom ends of the piston rods and the die members 140. As the upper plate 134 continues to descend, the blank will be engaged by the upper die member 148. Further descent of the die member 148 into the cavity 152 will tend to pull the outer portions of the blank 142 towards the centre of the die set. This inward pull will be resisted strongly by the liquid springs 10. In this manner, the blank 142 will be properly formed by being stretched by the die members to form the desired stamping.

One skilled in this art will apprciate that the illustrated dies are very simple in their construction and these dies have been used simply for ease of illustration. Metalworking dies for use in a press clearly can be very complex and the present liquid springs would be located in this complex die structure. This should emphasize the importance of the fact that these springs operate on their own with no hydraulic pipes or hoses attached.

Although not illustrated in the drawings, one skilled in this art will appreciate that it is quite possible to build a "dampening" feature into the described liquid springs. For example in the spring of FIG. 1, one could install one or more check valves in the apertures 54 to cause dampening during only downward (outward) movement of the piston rod. Other types of flow controls in the orifices could also be used for this purpose and can be made adjustable. It will also be understood that the liquid springs for use in the invention need not be completely filled with a compressible liquid. It is possible for some air or gas to be present in the internal chamber of the spring for some applications (depending on the particular force curve required).

The foregoing relates to specific preferred embodiments of the present invention, it being understood that other variants and embodiments thereof are possible within the spirit and scope of the invention, the latter of which is defined by the following claims.

I claim:

1. A metal working press comprising: a die set having a metal forming die and a workpiece supporting surface;

a liquid spring for use in firmly clamping a workpiece to said supporting surface during the operation of the press, said liquid spring comprising:
   a high pressure cylinder vessel having an internal chamber defined by a cylinder wall,
   a first sealed end,
   a second sealed end,
   a central axis extending between the first sealed end and the second sealed end,
   a body of a compressible liquid which is contained in the internal chamber and is pressurized prior to use of said liquid spring in said press by filling said interior chamber with said liquid at an initial pressure of at least 2,000 p.s.i., such that said liquid is under at least said initial pressure at all times during the operation of the press,
   a piston comprising a piston head located within the internal chamber and having a front surface and a rear surface,
   a piston rod of smaller diameter than said piston head, said rod being attached to the piston head at one end thereof, extending through an opening in said second sealed end, and having an outer end which is outside the cylinder vessel, said piston including a liquid chamber having an open end and a closed end, the open end communicating with said internal chamber at the piston head, the closed end being recessed into the piston rod,
   an annular gasket mounted in said second sealed end and in slidable, sealing contact with said piston rod, said front surface of the piston head being next to and in contact with said body of compressible liquid, and
   at least one flow passageway for permitting said liquid to flow freely from a region of said internal chamber adjacent said front surface to a space adjacent said rear surface of the piston head during operation of the spring, wherein said liquid spring is mounted to hold a workpiece in a desired position during operation of said press on said workpiece.

2. A press according to claim 1, further comprising means for urging the liquid spring in the direction of its central axis toward the supporting surface.

3. A press according to claim 1 wherein the liquid chamber extends through the piston head and into the piston rod.

4. A press according to claim 3 and further comprising means for urging the liquid spring in the direction of its central axis toward the support surface.

5. A press according to claim 4 wherein said liquid has a minimum operating pressure of at least 3,000 p.s.i.

6. A press according to claim 5 wherein said internal chamber of the vessel is completely sealed off from any external liquid supply and is not connected to any outside pressure vessel or pump.

7. A press according to claim 6 wherein the liquid is a silicone-based compressible liquid.

8. A press according to claim 3 wherein the liquid is a silicone-based compressible liquid.

9. A press according to claim 1 wherein said liquid has a minimum initial pressure of at least 3,000 p.s.i.

10. A press according to claim 9 wherein said at least one flow passageway is an annular gap extending in a radial direction from a circumferential wall of said piston head to said cylinder wall.

11. A press according to claim 10 wherein said annular gasket is a zero leakage seal made of plastic or Teflon based material.

12. A press according to claim 11 wherein said hole in said second end is substantially formed by an elongate annular guide bushing which is closely fitted to said piston rod and guides sliding movement of said piston rod.

13. A press according to claim 9 wherein the spring is completely sealed off from external hydraulic parts and components and any external liquid supply and is not connected to any outside pressure vessel or pump.

14. A press according to claim 9 wherein the liquid is a silicone-based compressible liquid.

15. A press according to claim 1 wherein the spring is completely sealed off from external hydraulic parts and components and any external liquid supply and is not connected to any outside pressure vessel or pump.

16. A press according to claim 1 wherein the liquid is a silicone-based compressible liquid.

17. A press according to claim 1 wherein said internal chamber of the vessel is completely sealed off from any external liquid supply and is not connected to any outside pressure vessel or pump.

18. A press according to claim 1 wherein said at least one flow passageway is an annular gap extending from a circumferential wall of said piston head to said cylinder wall.

19. A method of holding a workpiece in place for producing a desired object therefrom during a metalworking process, said method comprising the steps of:
   providing a metalworking press having a die assembly with a metal forming die and a workpiece support surface mounted therein;
   mounting a liquid spring for use in firmly clamping a workpiece to said support surface during the operation of the press, said liquid spring containing:
      a body of compressible liquid which is pressurized prior to said mounting step by filling an internal chamber of said spring defined by a cylinder wall and opposite sealed ends with said liquid at an initial pressure of at least 2,000 p.s.i. such that said liquid is under at least said initial pressure at all times during the operation of the press,
      a piston comprising a piston head located within the internal chamber and having front and rear surfaces, and a piston rod of smaller diameter than said piston head and attached to said piston head at one end, the other end of the rod extending through an opening in one of said sealed ends, said piston including a liquid chamber having an open end and a closed end, the open end communicating with said internal chamber at the piston head, the closed end being recessed into the piston;
   positioning said workpiece to be worked on the support surface;
   urging the spring toward the workpiece so as to pin the workpiece against the support surface with sufficient force provided by said spring to resist the workpiece from moving to an extent greater than desired tolerances during the operation of said press; and
   urging the die set against the workpiece so as to form the workpiece into the desired object.

20. A method of holding a workpiece according to claim 19 wherein said compressible liquid in said spring has a minimum initial pressure of at least 3000 p.s.i.

21. A method of holding a workpiece according to claim 19 including sealing off said spring from any external liquid supply whereby said spring operates independently of any outside pressure vessel or pump.

22. A method of holding a workpiece according to claim 21 wherein the liquid used in said spring is a silicone-based compressible liquid.

23. A method of holding a workpiece according to claim 19 wherein said liquid spring has at least one flow passageway permitting said compressible liquid to flow freely from a region of said internal chamber adjacent the front surface of the piston head to a space adjacent to the rear surface of the piston head when the spring is being urged toward the workpiece so as to pin the workpiece.

24. A method of holding a workpiece according to claim 19 wherein said piston head has a circumferential wall and an annular gap extends from said circumferential wall of said piston head to said cylinder wall and, when the spring is being urged toward the workpiece so as to pin the workpiece, said compressible liquid is able to flow freely through said gap from in front of the piston head to a space to the rear of the piston head.

* * * * *